United States Patent
Heisswolf et al.

(10) Patent No.: US 9,734,326 B2
(45) Date of Patent: Aug. 15, 2017

(54) DYNAMIC INTERRUPT STACK PROTECTION

(71) Applicants: Dirk Heisswolf, Munich (DE); Andreas Ralph Pachl, Neubiberg (DE); Alexander Stephan Schilling, Berg (DE)

(72) Inventors: Dirk Heisswolf, Munich (DE); Andreas Ralph Pachl, Neubiberg (DE); Alexander Stephan Schilling, Berg (DE)

(73) Assignee: NXP USA, Inc., Austin, TX (US)

(*) Notice: Subject to any disclaimer, the term of this patent is extended or adjusted under 35 U.S.C. 154(b) by 386 days.

(21) Appl. No.: 14/172,638

(22) Filed: Feb. 4, 2014

(65) Prior Publication Data
US 2015/0220464 A1 Aug. 6, 2015

(51) Int. Cl.
G06F 21/52 (2013.01)
G06F 12/14 (2006.01)

(52) U.S. Cl.
CPC .......... *G06F 21/52* (2013.01); *G06F 12/1441* (2013.01); *G06F 2212/1052* (2013.01)

(58) Field of Classification Search
None
See application file for complete search history.

(56) References Cited

U.S. PATENT DOCUMENTS

| | | |
|---|---|---|
| 4,084,224 A | 4/1978 | Appell et al. |
| 6,785,886 B1 | 8/2004 | Lim et al. |
| 7,200,761 B1* | 4/2007 | Freeman ............. G06F 11/2284 709/223 |
| 7,752,459 B2* | 7/2010 | Cowan ................. G06F 9/4426 711/163 |
| 8,209,523 B2 | 6/2012 | Nordqvist et al. |
| 9,075,621 B2* | 7/2015 | Schon ................... G06F 9/3865 |
| 2005/0240701 A1* | 10/2005 | Kuboshima ............ G06F 13/24 710/260 |
| 2006/0161739 A1* | 7/2006 | Genty ................. G06F 12/1466 711/152 |

(Continued)

OTHER PUBLICATIONS

Non-Final Office Action mailed Nov. 20, 2015 for U.S. Appl. No. 14/172,661, 16 pages.

(Continued)

*Primary Examiner* — Henry Tsai
*Assistant Examiner* — Christopher Bartels

(57) ABSTRACT

A protection unit of an interrupt stack accessible by a CPU controlled by one software program, for storing and removing stack frame(s), the stack protection unit being coupleable to the stack and the CPU, comprising:
a processor coupled to a first and a second address register;
wherein, when a first stack frame is stored onto the stack and the execution of the software program is suspended by the CPU, responsive to one or more occurring hardware IRQs;
the processing unit is adapted to set one access rule based on the first and second address registers, preventing:
the occurring ISR to be serviced, from accessing a hardware-protected region of the stack, comprising at least the first stack frame and at least one stack frame associated with one or more suspended IRQs.
A processor, a method and a computer program are also claimed.

20 Claims, 3 Drawing Sheets

(56) References Cited

U.S. PATENT DOCUMENTS

| | | | |
|---|---|---|---|
| 2008/0052468 A1* | 2/2008 | Speirs | G06F 13/4059 |
| | | | 711/132 |
| 2008/0071991 A1 | 3/2008 | Shaw et al. | |
| 2010/0077164 A1* | 3/2010 | Stiffler | G06F 11/1438 |
| | | | 711/162 |
| 2013/0013965 A1* | 1/2013 | Guillemin | G06F 21/52 |
| | | | 714/48 |
| 2014/0156972 A1* | 6/2014 | Shanbhogue | G06F 9/30145 |
| | | | 712/205 |
| 2014/0283040 A1 | 9/2014 | Wilkerson et al. | |

OTHER PUBLICATIONS

Microchip Technology, Inc., "PIC18F8733 Family Data Sheet: 64/80-Pin, 1-Mbit, Enhanced Flash Microcontrollers with 10-Bit A/D and nano Watt Technology," Section 5.1.3.4, 2008 Microchip Technology, Inc.; downloaded from <<http://ww1.microchip.com/downloads/en/DeviceDoc/39646c.pdf>> on Feb. 5, 2014, 4 pages.
U.S. Appl. No. 14/172,661, filed Feb. 4, 2014, entitled "Dynamic Subroutine Stack Protection".
Notice of Allowance mailed Jun. 15, 2016 for U.S. Appl. No. 14/172,661, 13 pages.

\* cited by examiner

DYNAMIC INTERRUPT STACK PROTECTION

CROSS-REFERENCE TO RELATED APPLICATION(S)

The present application is related to co-pending U.S. patent application Ser. No. 14/172,661, entitled "DYNAMIC SUBROUTINE STACK PROTECTION," filed on Feb. 4, 2014, the entirety of which is herein incorporated by reference.

FIELD OF THE INVENTION

This invention relates to an interrupt stack protection unit, a processor, a method and a computer program for protecting an interrupt stack.

BACKGROUND OF THE INVENTION

Computing systems generally provide means to react to high-priority conditions by interrupting an ongoing task to execute a condition-specific routine. When the high-priority condition or interrupt request (IRQ) has been resolved, code execution of the prior task is resumed at the point where the IRQ had occurred. Such interrupt capabilities are commonly implemented with the help of interrupt stacks. These stacks are Last-In-First-Out memory buffers which serve to temporarily store the context of the interrupted task, data and/or the local variables allocated by the condition-specific interrupt service routine (ISR). Many computing systems combine the interrupt stack along with the subroutine call. Interrupt stacks are vulnerable to many security and safety problems. Security problems typically manifest themselves in external attacks, such as stack buffer overflow attacks, where the attacker intentionally manipulates the saved context of the interrupted task to gain control over the computing system as the interrupted task is restored. Safety problems are unintended stack manipulation caused by software or hardware faults. These stack manipulations may have severe impact on the system integrity. In particular these stack manipulations provide a way for immature code segments to affect the functionality of mature code segments. While there are existing protection schemes against the mentioned security problems (e.g., software solutions using the insertion of canary codes), these only offer limited stack protection. Most computing systems don't provide any protection against the safety issues. Common protecting mechanisms like memory protection units (MPU) provide access restrictions on static memory ranges and are not suited for the dynamic boundaries required for the protection of interrupt stacks.

Therefore, in view of the lack of appropriate protection techniques, there is a need to provide for the dynamic protection of interrupt stacks.

SUMMARY OF THE INVENTION

The present invention provides an interrupt stack protection unit, a processor, a method and a computer program for protecting an interrupt stack, as described in the accompanying claims. Specific embodiments of the invention are set forth in the dependent claims. These and other aspects of the invention will be apparent from an elucidated with reference to the embodiments described hereinafter.

BRIEF DESCRIPTION OF THE DRAWINGS

Further details, aspects and embodiments of the proposed solution will be described, by way of example only, with reference to the drawings. In the drawings, like reference numbers are used to identify like or functionally similar elements. Elements in the figures are illustrated for simplicity and clarity and have not necessarily been drawn to scale.

DETAILED DESCRIPTION OF THE PREFERRED EMBODIMENTS

Because the illustrated embodiments of the proposed solution may for the most part, be composed of electronic components and circuits known to those skilled in the art, details will not be explained in any greater extent than that considered necessary for the understanding and appreciation of the underlying concepts of the subject application, in order not to obfuscate or distract from the teachings of the subject application.

However, for the sake of clarity, basic knowledge related to interrupt stacks will be reviewed. First of all, suffice to say that an interrupt stack is a section of a Random Access Memory (RAM) that is structured as a LIFO (Last In-First Out) buffer and which is reserved notably for storage of data and/or local variables of an interrupt service routine (ISR) and the context of interrupted tasks. Local variables are private to the ISR which allocated them. The context of an interrupted task consists of the data required to restore the task, such as the program counter, accumulators, index or data registers, as well as condition code flags. In general, ISRs are executed in response to the reception of an Interrupt Service Request (IRQ). An IRQ is typically caused by an external signal or by peripheral hardware. However, IRQ may also be triggered by software. An IRQ requests that the current CPU process is temporarily suspended for the execution of the ISR. For instance, in a computer system comprising a keyboard, when a character is typed on the keyboard an IRQ is triggered and an ISR is called for servicing the triggered IRQ. When an IRQ is received, the execution context of the current process is stored on the interrupt stack and an ISR is executed performing all actions required by the IRQ and possibly allocating local variables. Later, when the execution of the ISR is completed, the execution context is retrieved from the interrupt stack and the previous process is resumed. It is important to note that an IRQ can occur during the execution of another ISR, i.e., an IRQ which is serviced can be suspended by another occurring IRQ and so on. Therefore, the interrupt stack size grows and shrinks depending on how many IRQ have been interrupted at any time.

Figure 1:
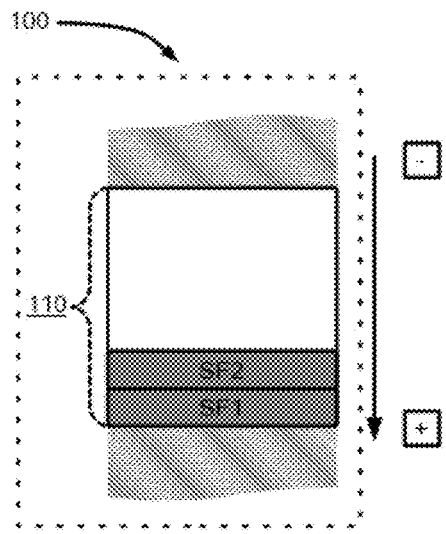
FIG. 1 is a schematic diagram of an interrupt stack.

Referring to FIG. 1, there is diagrammatically shown therein a Random Access Memory (RAM) 100 comprising an interrupt stack 110. The exemplary interrupt stack 110 of FIG. 1 is having memory addresses extending between a lowest address (−), referred to as "overflow boundary" or "stack top" and a highest address (+), referred to as "underflow boundary" or "stack bottom". However, it is also common to have interrupt stacks being represented the other way around i.e., overflow boundary located at the highest address and the underflow boundary located at the lowest address of the stack. A space on the interrupt stack 110 provided to hold data, local variables and/or the context of the interrupted task is called a stack frame. In the example of FIG. 1, there are two stack frames SF1 and SF2. The principle of LIFO buffer used in the interrupt stack 110 can be visualized as a stack of papers wherein the last item placed onto the stack will be the first item taken off of it. The process of adding something onto the interrupt stack 110 is referred to as "pushing" it onto the stack while the process of removing an item from the stack is referred to as "pulling" it off. Consequently, in FIG. 1, it should be understood that SF1 has been pushed onto the interrupt stack 110 before SF2. Also, if a stack frame was to be pulled off the interrupt stack 110, SF2 would be pulled off before SF1.

The boundary addresses of a stack frame such as stack frame SF1 or stack frame SF2 will be denoted as bottom address and top address thereof. In case of a stack having an overflow boundary located at the lowest address and the underflow boundary located as the highest address, the bottom address of a stack frame refers to the highest address thereof and the top address of a stack frame refers to the lowest address thereof. In case of a stack having an overflow boundary located at the highest address and the underflow boundary located as the lowest address, the bottom address of a stack frame refers to the lowest address thereof and the top address of a stack frame refers to the highest address thereof. FIG. 1 and the following embodiments are described with reference to a stack having memory addresses extending between a lowest address (−) referred to as "overflow boundary" and a highest address (+) referred to as "underflow boundary". Those skilled in the art will understand that the invention will be likewise applicable to a stack with an overflow boundary located at the highest address and the underflow boundary located at the lowest address.

Figure 2:
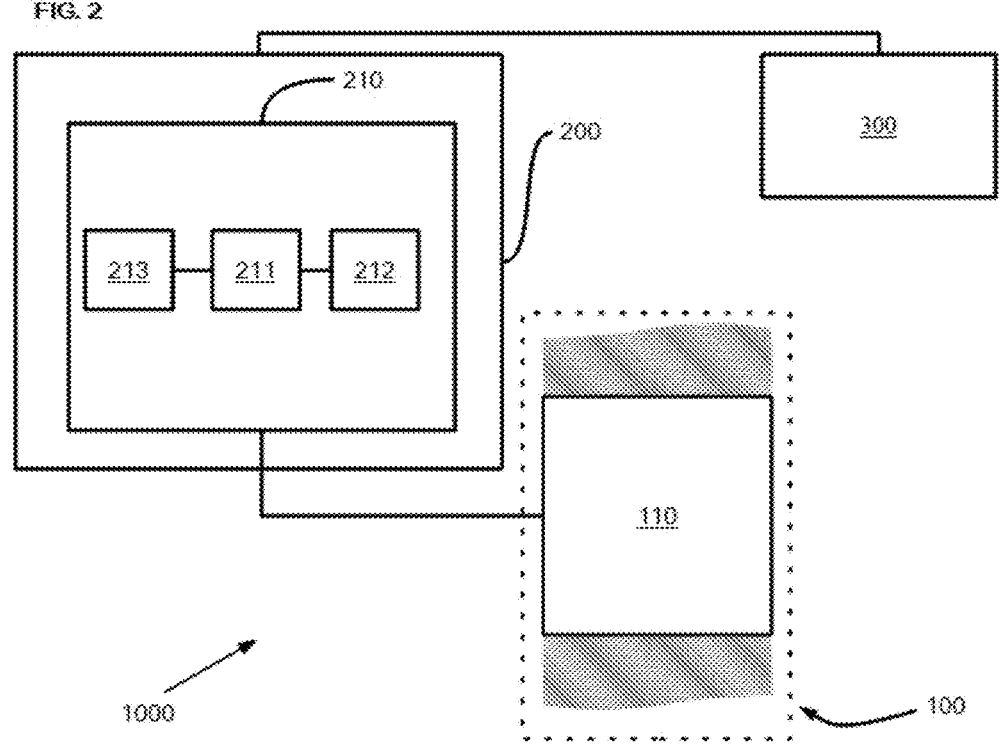
FIG. 2 is a schematic diagram of a computer system according to embodiments of the subject application.

Referring now to FIG. 2, there is diagrammatically shown therein a computer system 1000 comprising:
the RAM 100 of FIG. 1,
a central processing unit of the computer system 1000 such as a central processor (CPU) 200 operably coupled to the interrupt stack 110, and,
a software program 300 operably coupled to the CPU 200.

In example of embodiments, the Random-Access Memory (RAM) 100 is configured to hold the interrupt stack 110. The exemplary CPU 200 is a program controlled semiconductor device which fetched, decodes and executes instructions. Such instructions may be provided by the software program 300. The software program 300 may be stored in a Read-Only memory (ROM) or also a Random Access Memory (RAM). The CPU 200 of FIG. 2 comprises an interrupt stack protection unit 210 adapted to prevent unauthorised access to at least part of the interrupt stack 110. Indeed, when the software program 300 is executed by the CPU 200, IRQs may occur and may suspend the execution of the current task of the software program 300. The suspension of the task is followed by the CPU 200 transferring control to the ISR. The ISR usually determines the cause of the IRQ, takes appropriate actions and then return control back to the task that was suspended. However, during the execution of an ISR for servicing a particular IRQ, additional IRQs may be received as well by the CPU 200. Consequently, at given moment in time the CPU 200 may execute nested ISRs and the interrupt stack 110 may comprise several stack frames associated with the nested ISRs arranged on top of each other. Software programs 300 may consist of individual software components with varying levels of safety qualifications. To avoid a degrading of secure software components due to the fact that they may be compromised by software components of lower security rating, these software components must be isolated from each other. For static memory ranges, this can be accomplished with the help of a memory protection unit (MPU) or a memory management unit (MMU). However interrupt stacks are typically shared by these software components without any form of hardware protection. For instance, an ISR triggered by a message coming from a controller area network (CAN) interface and an ISR triggered by a time-out event may have been implemented according to different safety standards. Therefore in such situation, one would not want the different ISRs to influence on each other or to interact with each other. In other words, in such situation, one would only want each ISR to access the stack frame(s) allocated to its execution and not the other stack frame(s) allocated to the others ISRs. Thereby, the proposed interrupt stack protection unit 210 of the subject application aims at achieving such effect.

Referring back to FIG. 2, the interrupt stack protection unit 210 is operably coupled to the interrupt stack 110 though the CPU 200 and comprises:
a processing unit such as a processor 211, and
a first and a second address register 212, 213.

In examples of implementations, the first and second registers 212, 213 are storage elements, operably coupled to the processor 211. Further, each of the first and second registers 212, 213 is adapted to store an address within the range of the interrupt stack 110. Additionally, the first and second registers 212, 213 may not be accessible by any code in execution and/or any software such as the software program 300. In an embodiment, the first address register 212 is a constant value. Indeed, as it will be later shown, the value stored in the first address register is not meant to be changed through the overall process disclosed in the subject application. The exemplary processor 211 is a program controlled semiconductor device which fetched, decodes and executes instructions. In the following, the processor 211 is adapted to push stack frame(s) onto the interrupt stack 110, pull stack frame(s) from the interrupt stack 110. Also, as the processor 211 is operably coupled to the first and second registers 212, 213, it is also adapted to access and manipulate their content.

Figure 3A:
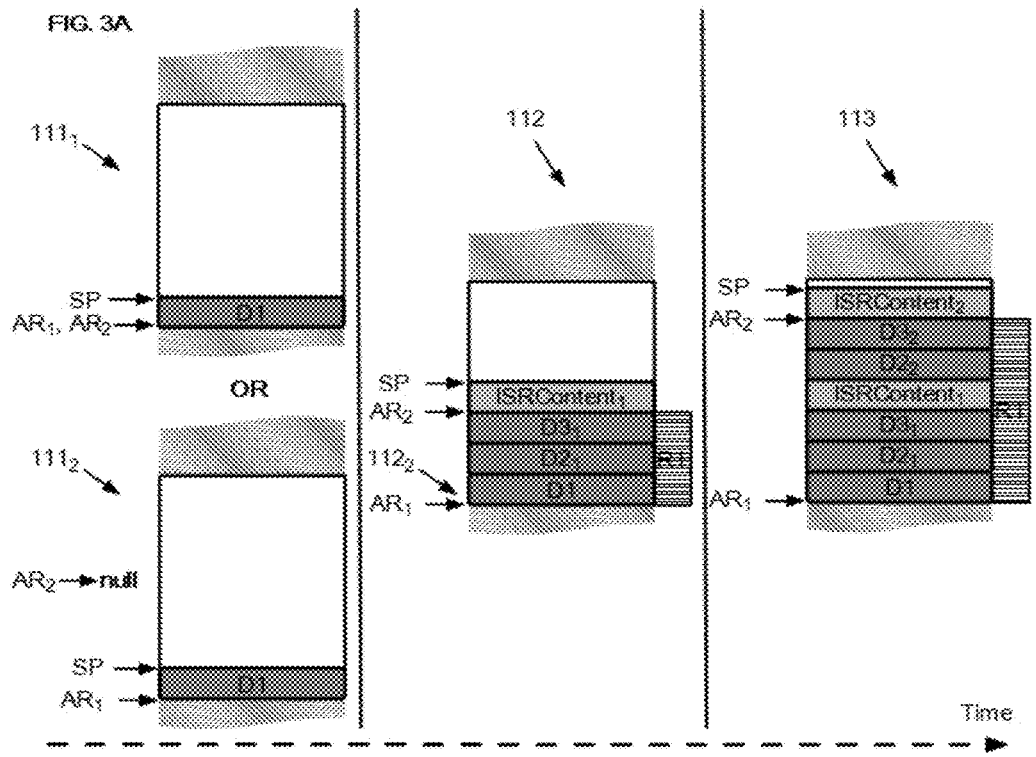
FIGS. 3A-3B are schematic diagrams of the interrupt stack of FIG. 1 according to embodiments of the subject application.
Figure 3B:
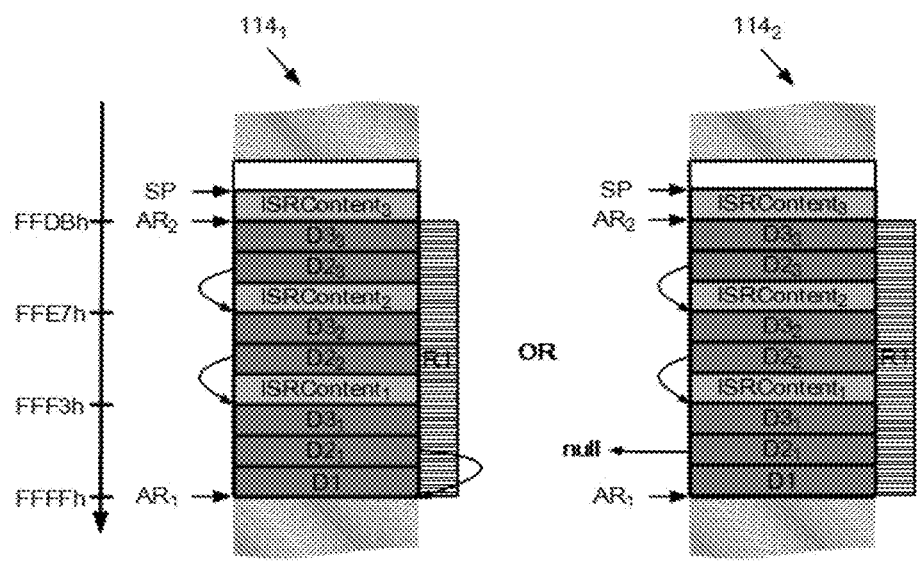
Figure 4:
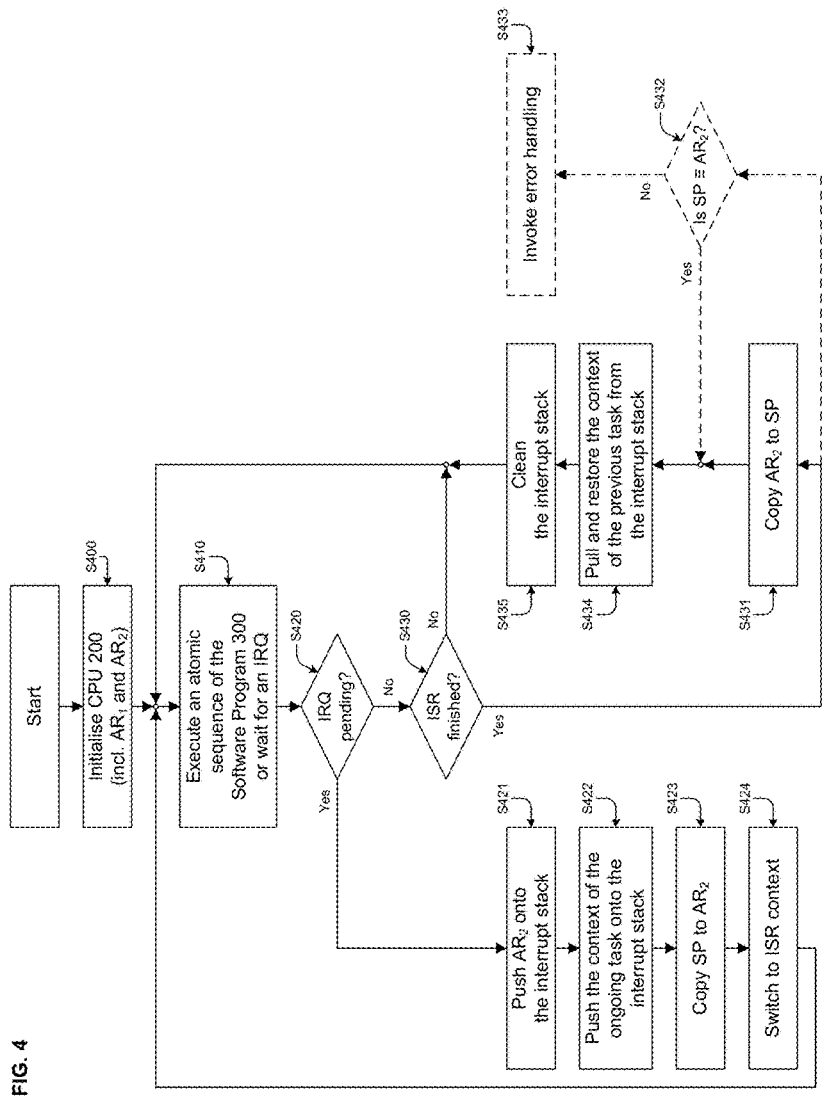
FIG. 4 is a schematic flow diagram of a method of preventing unauthorised access to the interrupt stack of FIG. 1 according to an embodiment of the subject application.

Hereinafter, FIGS. 3A-3B along with FIG. 4 will be described altogether. In FIGS. 3A-3B there is diagrammatically shown therein schematic diagrams of the interrupt stack 110 according to embodiments of the subject application. Referring to FIG. 4, there is diagrammatically shown therein a schematic flow diagram of a method of preventing unauthorised access to the interrupt stack 110 according to an embodiment of the subject application.

In the examples of FIGS. 3A-3B the first address register 212 is identified as $AR_1$ and the second address register 213 is identified as $AR_2$. Also, there is represented in FIGS. 3A-3B, a stack pointer register, identified as SP, which is an address register associated with the CPU 200 and which automatically points to the top of the interrupt stack 110 (i.e., the most recent stack entry) as it grows and shrinks in size. Further, throughout the present application, it will be assumed that the stack pointer SP grows up towards the overflow boundary of the interrupt stack 110 and shrinks towards the underflow boundary (i.e., the bottom) of the interrupt stack 110. Consequently, the stack pointer SP is always pointing to the most recent entry of the interrupt stack 110 where a stack frame has been pushed. However, in other implementations of the interrupt stack 110, the stack pointer SP may be pointing at the next free memory location of the where a stack frame can be pushed.

Referring now to FIG. 4, in S400 the CPU 200 is reset and initialized for the execution of the software program 300. Additionally $AR_1$ 212 and $AR_2$ 213 are initialized as well. In an embodiment illustrated in FIG. 3A $111_1$, $AR_1$ 212 and $AR_2$ 213 are initialised to the highest address associated with the stack frame D1 (i.e., the bottom of the interrupt stack 110). For example, if the bottom address of the interrupt stack 110 is set to the address FFFFh in hexadecimal notation then in accordance with the embodiment of FIG. 3A $111_1$, the following pseudocode could represent the initialisation of $AR_1$ 212 and $AR_2$ 213:

$AR_1$=FFFFh, and
$AR_2$=FFFFh.

In another embodiment illustrated in FIG. 3A $111_2$, $AR_1$ 212 is initialised to the highest address associated with the stack frame D1 and $AR_2$ 213 is initialised to a null address. The null address is an address which by convention points to an address made only of 0s (e.g. 0000h in hexadecimal notation). However, any purposive address value outside the address range of the interrupt stack 100 can serve as a null pointer value. For example, if the bottom address of the interrupt stack 110 is set to FFFFh then in accordance with the embodiment of FIG. 3A $111_2$, the following pseudocode could represent the initialisation of $AR_1$ 212 and $AR_2$ 213:

$AR_1$=FFFFh, and
$AR_2$=0000h.

In S410, once CPU 200, $AR_1$ 212, and $AR_2$ 213 have been initialised, the CPU 200 executes one atomic sequence of the software program 300. If the CPU is instructed to idle, it waits for an IRQ or any wake-up event to occur before proceeding. Once the execution has been completed or an IRQ or a wake-up event has occurred, it is checked whether an IRQ is to be serviced (S420) or whether an ongoing ISR has been completed (S430). If neither one of the case is experienced, a further portion of the software program 300 is to be executed (S410). In the example FIG. 3A 111, the execution of the software program 300 may cause a stack frame D1 to be allocated on the interrupt stack 110. The stack frame D1 may comprise for example data and/or local variables that can be manipulated by the software program 300 during execution. Nevertheless, it is important to note that the software program 300 may not need any associated stack frame on the interrupt stack 110 while being in operation. Therefore, an IRQ may occur whether there is or not a stack frame on the interrupt stack 110.

As said earlier, an IRQ is a mechanism which asks the CPU 200 to interrupt the ongoing flow of the software program 300 in order to execute another set of code (i.e., the interrupt Service Routine ISR, also known as interrupt handler) in response to some event such as problems with hardware devices external to the computer system 1000, such as resets or power failures. Such hardware devices are operably coupled to the computer system 1000. Therefore, it is to be understood that the occurrence of IRQs is mostly asynchronous with reference to the flow of the software program 300.

Referring now to FIG. 3A 112, when an IRQ is about to be serviced (i.e. handled), the content of the second address register 212 which is illustrated as the stack frame $D2_1$, is pushed onto the interrupt stack 110 (S421). Also, the execution context of the CPU 200 which is illustrated as the stack frame $D3_1$, is pushed onto the interrupt stack 110 (S422). It is to be noted that in one embodiment, the stacking order of entries of $D2_i$ and $D3_i$ may be organised the other way around or even be interleaved. As said earlier, the execution context is a set of critical registers (e.g. program counter, accumulator, flags register) held in the registers of the CPU 200 prior the servicing of the occurring IRQ. Thus saving the execution context of the CPU 200 existing prior the execution of the ISR will make it possible to return from the ISR to the state of the CPU 200 at the time the software program 300 was suspended. In the example of FIG. 3A 112, the second address register 213 stores the lowest address associated with the stack frame $D3_1$ (S423). In accordance with the embodiment of FIG. 3A 112, the following pseudocode could represent the setting of $AR_2$ 213 during the stacking of the interrupt stack 110:

$AR_2$=LowAddr($D3_1$)

wherein LowAddr(•) is a function configured to return the lowest address associated with a stack frame or stack range provided as a parameter. In an implementation of LowAddr (•), the following pseudocode could represent the setting of $AR_2$ 213: $AR_2$=SP. Indeed, every time a stack frame is pushed onto or pulled off the interrupt stack 110, SP is automatically updated and its value can be used to set the content of the address registers at given moment in time. For instance, when $D3_1$, is pushed onto the interrupt stack 110, SP is automatically set to the top of the stack. Therefore, at this moment and before a further stack frame such as $ISRContent_1$ in FIG. 3A 112 is pushed onto the interrupt stack 110, it is possible to retrieve the value of SP and assign it to $AR_2$. The ISR associated with the currently occurring IRQ is prevented from accessing a hardware-protected region of the interrupt stack 110. Referring to FIG. 3A 112 the hardware-protected region is illustrated as R1. The hardware-protected region R1 extends between the address of the interrupt stack 110 stored in the second address register 212 and the address of the interrupt stack 110 stored in the first address register 213. As the first and second address registers 212, 213 are not accessible through software, their content may not be altered and the integrity of the hardware-protected region R1 is preserved from software malicious attacks. However in one embodiment it may be possible to temporarily remove the access restrictions imposed within the hardware-protected region R1 for privileged tasks of the software program 300. For instance, this may be required to implement interrupt triggered context switches within the software program 300. In accordance with the embodiment of FIG. 3A 112, the following pseudo-code could represent the setting of the hardware-protected region R1 in a locked position:

Stack.LockRegion($AR_1$, $AR_2$)

wherein LockRegion(•) is a function configured to lock a given region of a stack, the region extending between the content of at least two hardware address registers provided as a parameters. The protection of the hardware-protected region R1 may be performed by setting at least one access rule indicative of appropriate access rights such as read, write and/or execute. This way the hardware-protected region R1 may be protected form reading, writing and/or execution. Hence, as the hardware-protected region R1 may be non-executable, an injected malicious code could not be executed. For the one of ordinary skills in the art of computer systems, such hardware protection may be enforced using similar techniques as used in current MPUs (Memory Protection Units). In FIG. 3A 112, once the hardware-protected region R1 has been protected, the execution of the ISR begins (S424) and a temporary data associated with the servicing of the current IRQ may be pushed onto the interrupt stack 110 if needed. For example in FIG. 3A 112 such a stack frame is illustrated as $ISRContent_1$.

In view of the above-described mechanism, it is now clear that when the software program 300, executed by the CPU 200, is suspended by the occurrence of an IRQ, the ISR associated with the IRQ is prevented from accessing part of the interrupt stack 110 which is not of interest for its execution. In other words, an ISR servicing an IRQ which has suspended the execution of the software program 300 can only access the memory space allocated for it. Therefore, a currently occurring IRQ associated with an ISR comprising malicious code may not access the data and/or local variables used by the suspended software program 300. Hence, once the servicing of the currently occurring IRQ has terminated, the stored execution context may be restored and the flow of the software program 300 may resume from where it has been suspended.

Referring back to FIG. 4 during the execution of an ISR (S410), a new interrupt request (IRQ) may be received before the execution of the current ISR is finished (S420). If the new IRQ is serviced immediately, a nested ISR is started following steps S421 to S424. Indeed when an ISR is being executed by the CPU 200, the flow of execution of the ISR may be suspended by another ISR servicing a newly occurring IRQ. Referring now to FIG. 3A 113, when a newly occurring IRQ is about to be serviced (i.e. handled) while ongoing ISR is suspended, the content of the second address register 212 which is illustrated as the stack frame $D2_2$, is pushed onto the interrupt stack 110. Also, the execution context of the CPU 200 which is illustrated as the stack frame $D3_2$, is pushed onto the interrupt stack 110. In the example of FIG. 3A 113, the second address register 213 stores the lowest address associated with the stack frame $D3_2$. In accordance with the embodiment of FIG. 3A 113, the following pseudocode could represent the setting of $AR_2$ 213 during the stacking of the interrupt stack 110: $AR_2$=LowAddr($D3_2$). In an implementation of LowAddr(•), the following pseudocode could represent the setting of $AR_2$ 213: $AR_2$=SP at appropriate moment in time, as already explained earlier. As the hardware-protected region R1 is delimited by $AR_1$ and $AR_2$ it can be clearly seen while comparing FIG. 3A 112 and FIG. 3A 113, that the hardware-protected region R1 has grown. Further in FIG. 3A 113, once the hardware-protected region R1 has been adjusted, a stack content associated with the servicing of the currently occurring IRQ may be pushed onto the interrupt stack 110 if needed. For example in FIG. 3A 113 such stack frame is illustrated as $ISRContent_2$.

The whole process can be repeated until all the occurring IRQs have been serviced. For instance, referring to FIG. 3B 114 a third ISR is being executed as indicated by the stack frame $ISRContent_3$ and the first and second ISR associated respectively with the stack frame $ISRContent_1$ and $ISRContent_2$ are being suspended.

As can be seen, the proposed mechanism provides for a hardware-protected region R1 which is constantly adjusted to prevent the currently executed ISR from accessing stack content associated with any of the currently interrupted tasks of the software program 300. Also, as new nested ISRs are being executed the hardware-protected region R1 is extended such that an ISR servicing an IRQ which has suspended the execution of another ISR can only access the memory space allocated for it.

Another advantage of the proposed solution is the generation of a particular list of addresses while the hardware-protected region R1 is created. The generated list comprises elements being indicative of the lowest address associated with a stack frame associated with the execution context of an ISR (i.e. the stack frames illustrated as $D2_i$ in FIGS. 3A-3B: $D2_1$, $D2_2$ and $D2_3$). This list allows the restoration of the previous state of the hardware-protected region R1 whenever the execution of one of the nested ISR is complete. In the example FIG. 3B 114 with reference to FIG. 3A 111, the last element of the list is either the null address or the highest address associated with the first stack frame D1. In order to exemplify the creation of the list, it will be assumed in FIG. 3B that the bottom address of the interrupt stack 110 is set to FFFFh and that the size of each stack frame is fixed to four bytes. Therefore, referring to FIG. 3B ($114_1$) the list comprise the following elements: {FFE7h; FFF3h; FFFFh}. On the other hand, referring to FIG. 3B ($114_2$) the list comprise the following elements: {FFE7h; FFF3h; null}. The list may be used as a Last In-First Out (LIFO) linked-list wherein the information contained therein may be used while the interrupt stack 110 is unstacked. Indeed, when the last triggered ISR (e.g. the one associated with the stack frame located on top of the interrupt stack 110) has finished its execution, it is possible to restore the execution context of the previous ISR that has been put on hold. This operation is normally performed automatically by the CPU 200. However the CPU 200 is not able to restore the hardware-protected region R1 that exist when the previous ISR was in execution. With the proposed solution and particularly the feature of the LIFO linked-list, it is possible to restore the previous hardware-protected region R1 along with the restoration of the previous execution context associated with the previous ISR. For example, referring to FIG. 3B 114 when the execution of the third ISR has terminated, the following operations may be performed to revert to the previous state of the interrupt stack 110:

remove $ISRContent_3$ from the interrupt stack 110 (S431) or verify that $ISRContent_3$ has been properly removed from the interrupt stack 110 by the ISR prior to its completion (S432). In the event where $ISRContent_3$ has not been removed from the interrupt stack 110 by the ISR an error handling invocation can be triggered (S433);

restore the context of execution of the second ISR based on the content of the stack frame $D3_3$ and pull out $D3_3$ from the interrupt stack 110, bypassing any read access restriction imposed within the hardware-protected region R1 (S434). However, in one embodiment where the stacking order of D2 and D3 is reversed, there is no need to bypass the protection for unstacking D3;

store in the second address register 213 ($AR_2$) the content of the stack frame $D2_3$ and pull out $D2_3$ from the interrupt stack 110, bypassing any read access restriction imposed within the hardware-protected region R1 (S435). By restoring the content of second address register 213 ($AR_2$), the previous state of the hardware-protected region R1 will be restored as well; and, resume the execution of the second ISR.

In accordance with the embodiment of FIG. 3B 114, the bypassing of the access rule to the hardware-protected region R1 can be performed temporarily by granting read access to the hardware-protected region R1. For instance, the following pseudocode could represent the setting of the hardware-protected region R1 in an unlocked position:

Stack.UnLockRegion(R1)

wherein UnLockRegion(•) is a function configured to unlock a given region of a stack, the region being provided as a parameter. After cleaning the interrupt stack 110 and restoring the previous context, the hardware-protected region R1 may be protected again as already described above. In the example of FIG. 3B $114_1$ when the interrupt stack 110 is unstacked, it is possible to determine the end of the LIFO linked-list by comparing each element with the content of the first address register 212. Indeed, the content of the first address register 212 is not changed during the whole process (e.g., in the example of FIG. 3B (114), it is always set to the address FFFFh). Therefore, if while parsing the LIFO linked-list the current element is equal to the content of the first address register 212 then it can be deduced that the end of the LIFO linked-list has been reached and that the process of restoring the previous hardware-protection region R1 should be stopped. In the example of FIG. 3B 114$_2$ when the interrupt stack 110 is unstacked, it is possible to determine the end of the LIFO linked-list by comparing each element with the null address. Indeed, the second address register 213 was originally initialised to the null address in FIG. 3A 111$_2$ when there was no stack frame associated with an ISR on the interrupt stack 110. Therefore, if while parsing the LIFO linked-list the current element is equal to the null address then it can be deduced that the end of the LIFO linked-list has been reached and that the process of restoring the previous hardware-protection region R1 should be stopped.

The skilled person would appreciate that the proposed solution provides a mechanism for preventing a contiguous region R1 of the interrupt stack 110 from being accessible by an ongoing ISR servicing a currently occurring IRQ. The one of ordinary skills in the art of computer systems will understand that the proposed solution of the subject application can be applied for instance to hardware based and software based IRQs that do not need any parameters passing with the software program or IRQ which launch them. Also based on the feature of the LIFO linked-list made of specific addresses of the interrupt stack 110 established while new stack frames are pushed onto the interrupt stack 110, it is also possible to keep record of the different status of protection of the interrupt stack 110, directly in the interrupt stack 110, while the interrupt stack 110 is unstacked. Then, when the interrupt stack 110 is unstacked after the termination of execution of an ISR, the previous execution context of the CPU 200 along with the previous status of protection of the interrupt stack 110 (i.e. the previous state of the hardware-protected region R1) may be restored altogether. Hence as the interrupt stack 110 dynamically grows or shrinks, the hardware-protected region R1 is dynamically adjusted. This solution is achieved by solely using two address registers 212, 213 wherein the first address register 212 may simply be a constant since its value does not change throughout the overall solution of the subject application once it is defined for the first time. The implementation of the proposed solution can be eased by closely following the stack pointer SP while it is updated (i.e. incremented and decremented). This way, several ISRs executing code having different safety or security certifications may be colocated within the same interrupt stack 110. In fact, thanks to the proposed solution the interrupt stack 110 may be shared by several untrusted hardware devices, each being capable of triggering independent IRQs. Therefore, with the proposed solution it is not necessary, for example, to use different interrupt stacks for nested ISRs. The proposed solution contrasts with conventional implementations of interrupt stacks since in that case, ISRs are usually launched with administrative privileges (e.g., super user) and are thus considered to be trusted. However, in practice ISRs are part of the drivers of hardware devices which usually originate from different manufacturers. Hence, the proposed solution may be of great interest for computer systems where implementation cost and robustness are of utmost importance such as in embedded computer systems. The proposed solution also does not introduce any overhead to the software program since all the information necessary for the protection of the interrupt stack 110 is obtained by the hardware. Therefore, all existing software programs may benefit from the advantage of the proposed solution without needing any modifications. Additionally, contrary to other solutions there is no need to adjust the stack pointer SP when exiting an ISR.

The above description elaborates embodiments of the subject application with regard to a stack having an overflow boundary located at the lowest address and the underflow boundary located as the highest address. However, those skilled in the art will understand on the basis of the teaching of the present application that a stack having an overflow boundary located at the highest address and the underflow boundary located as the lowest address may likewise be applicable in conjunction with the present application. In order to adapt the above teaching to the latter stack memory organization, a highest address should be replaces with a lowest address and vice versa.

Of course, the above advantages are exemplary, and these or other advantages may be achieved by the proposed solution. Further, the skilled person will appreciate that not all advantages stated above are necessarily achieved by embodiments described herein.

The proposed solution may also be implemented in a computer program product stored in a non-transitory computer-readable storage medium that stores computer-executable code which causes a processor computer to perform the operation of the interrupt stack protection unit 210 and/or the exemplary method as illustrated in for instance.

A processor comprising the interrupt stack protection unit 210 of the subject application is also claimed.

A computer program product is a list of instructions such as a particular application program and/or an operating system. The computer program may for example include one or more of: a subroutine, a function, a procedure, an object method, an object implementation, an executable application, an applet, a servlet, a source code, an object code, a shared library/dynamic load library and/or other sequence of instructions designed for execution on a computer system.

The computer program may be stored internally on computer readable storage medium or transmitted to the computer system via a computer readable transmission medium. All or some of the computer program may be provided on computer readable media permanently, removably or remotely coupled to an information processing system. The computer readable media may include, for example and without limitation, any number of the following: magnetic storage media including disk and tape storage media; optical storage media such as compact disk media (e.g., CD-ROM, CD-R, etc.) and digital video disk storage media; non-volatile memory unit storage media including semiconductor-based memory units such as FLASH memory, EEPROM, EPROM, ROM; ferromagnetic digital memories; MRAM; volatile storage media including registers, buffers or caches, main memory, RAM, etc.; and data transmission media including computer networks, point-to-point telecommunication equipment, and carrier wave transmission media, just to name a few.

A computer process typically includes an executing (running) program or portion of a program, current program values and state information, and the resources used by the operating system to manage the execution of the process. An operating system (OS) is the software that manages the sharing of the resources of a computer and provides programmers with an interface used to access those resources. An operating system processes system data and user input, and responds by allocating and managing tasks and internal system resources as an operation to users and programs of the system.

The computer system may for example include at least one processing unit, associated memory unit and a number of input/output (I/O) devices. When executing the computer program, the computer system processes information according to the computer program and produces resultant output information via I/O devices.

In the foregoing specification, the proposed solution has been described with reference to specific examples of embodiments of the proposed solution. It will, however, be evident that various modifications and changes may be made therein without departing from the broader scope of the proposed solution as set forth in the appended claims.

Those skilled in the art will recognize that the boundaries between logic blocks are merely illustrative and that alternative embodiments may merge logic blocks or circuit elements or impose an alternate decomposition of functionality upon various logic blocks or circuit elements. Thus, it is to be understood that the architectures depicted herein are merely exemplary, and that in fact many other architectures may be implemented which achieve the same functionality.

Any arrangement of devices to achieve the same functionality is effectively "associated" such that the desired functionality is achieved. Hence, any two devices herein combined to achieve a particular functionality may be seen as "associated with" each other such that the desired functionality is achieved, irrespective of architectures or intermediate devices. Likewise, any two devices so associated can also be viewed as being "operably connected", or "operably coupled", to each other to achieve the desired functionality.

Furthermore, those skilled in the art will recognize that boundaries between the above described operations merely illustrative. The multiple operations may be combined into a single operation, a single operation may be distributed in additional operations and operations may be executed at least partially overlapping in time. Moreover, alternative embodiments may include multiple examples of a particular operation, and the order of operations may be altered in various other embodiments.

Also for example, the examples, or portions thereof, may implemented as soft or code representations of physical circuitry or of logical representations convertible into physical circuitry, such as in a hardware description language of any appropriate type.

Also, the proposed solution is not limited to physical devices or units implemented in nonprogrammable hardware but can also be applied in programmable devices or units able to perform the desired device functions by operating in accordance with suitable program code, such as mainframes, minicomputers, servers, workstations, personal computers, notepads, personal digital assistants, electronic games, automotive and other embedded systems, cell phones and various other wireless devices, commonly denoted in this application as "computer systems". However, other modifications, variations and alternatives are also possible. The specifications and drawings are, accordingly, to be regarded in an illustrative rather than in a restrictive sense.

In the claims, any reference signs placed between parentheses shall not be construed as limiting the claim. The word 'comprising' does not exclude the presence of other elements or operations then those listed in a claim. Furthermore, the terms "a" or "an", as used herein, are defined as one or as more than one. Also, the use of introductory phrases such as at least one and one or more in the claims should not be construed to imply that the introduction of another claim element by the indefinite articles "a" or an limits any particular claim containing such introduced claim element to inventions containing only one such element, even when the same claim includes the introductory phrases one or more or at least one and indefinite articles such as "a" or "an". The same holds true for the use of definite articles. Unless stated otherwise, terms such as "first" and "second" are used to arbitrarily distinguish between the elements such terms describe. Thus, these terms are not necessarily intended to indicate temporal or other prioritization of such elements. The mere fact that certain measures are recited in mutually different claims does not indicate that a combination of these measures cannot be used to advantage.

The invention claimed is:

1. A computer system comprising:
   a first memory storing an interrupt stack, the interrupt stack structured as a Last In-First Out (LIFO) buffer and having memory addresses extending between a top address and a bottom address;
   a second memory storing a software program;
   a central processing unit (CPU) configured to access the software program and including an interrupt protection unit with a first address register, a second register and a processor coupled to the first address register and the second address register, the first and the second address register each storing a respective address of the interrupt stack, and the processor and the CPU coupled to the first memory to access the interrupt stack to store and remove at least one stack frame onto and off the stack as directed by the software program, the processor configured to:
   set an access rule based on at least the first and second address registers when a first stack frame is stored onto the stack and an execution of the software program is suspended by the CPU responsive to an occurrence of a first interrupt service request (ISR) to prevent a first interrupt service routine that services the first ISR from accessing a hardware-protected region of the stack, the hardware-protected region of the stack comprising the first stack frame and at least one stack frame associated with one or more suspended interrupt service routines that service one or more suspended ISRs,
   wherein when the first stack frame has been stored onto the stack and the execution of the software program is suspended by the CPU, responsive to one or more occurring ISRs the processor is configured to hold a first set of contiguous stack frames corresponding to the first ISR, a second set of contiguous stack frames corresponding to a second ISR and a third set of contiguous stack frames corresponding to a third ISR in the stack in a LIFO linked list, until the one or more occurring ISRs interrupt service requests are serviced.

2. The computer system of claim 1, wherein the LIFO linked list is part of the LIFO buffer.

3. The computer system of claim 1, wherein the first address register stores the bottom address and the second address register stores the top address.

4. The computer system of claim 1, wherein when the first stack frame is stored onto the stack, the processor stores the bottom address associated with the first stack frame in the first address register, and the processor stores the top address associated with the first stack frame in the second address register.

5. The computer system of claim 4, wherein the processor recursively:

stores onto the stack a second stack frame comprising the content of the second address register;

stores in the second address register the top address associated with a third stack frame stored onto the stack by the CPU, the third stack frame comprising an execution context of the CPU existing prior the servicing of a currently occurring ISR; and sets at least one access rule to the hardware-protected region preventing the currently occurring ISR to be serviced from accessing the hardware-protected region of the stack, the hardware-protected region extending between the address of the stack stored in the first address register and the address of the stack stored in the second address register.

6. The computer system of claim 5, wherein, when the occurring ISR has been serviced, the processor stores in the second address register one address selected between: a null address, the bottom address associated with the first stack frame, and the content of the latest stored second stack frame.

7. The computer system of claim 5, wherein, when the occurring ISR has been serviced, the processor stores in the second address register one address selected between: a null address, the bottom address associated with the first stack frame, and the content of the latest stored second stack frame.

8. A method performed with a central processing unit (CPU) including an interrupt protection unit having a first address register, a second register and a processor coupled to the first address register and the second address register, the first and the second address register each storing a respective address of an interrupt stack structured as a Last In-First Out (LIFO) buffer and having memory addresses extending between a top address and a bottom address, and the processor and the CPU coupled to access the interrupt stack to store and remove at least one stack frame onto and off the interrupt stack, the method comprising:

setting an access rule based on at least the first and second address registers when a first stack frame is stored onto the stack and an execution of a software program is suspended by the CPU responsive to an occurrence of a first interrupt service request (ISR) to prevent a first interrupt service routine that services the first ISR from accessing a hardware-protected region of the stack, the hardware-protected region of the stack comprising the first stack frame and at least one stack frame associated with one or more suspended interrupt service routines that service one or more suspended ISRs; and when the first stack frame has been stored onto the stack and the execution of the software program is suspended by the CPU responsive to one or more occurring ISRs, holding a first set of contiguous stack frames corresponding to the first ISR, a second set of contiguous stack frames corresponding to a second ISR and a third set of contiguous stack frames corresponding to a third ISR in the stack in a LIFO linked list, until the one or more occurring ISRs interrupt service requests are serviced.

9. The method of claim 8, wherein the LIFO linked list is part of the LIFO buffer.

10. The method of claim 8, wherein the first address register stores the bottom address and the second address register stores the top address.

11. The method of claim 8, wherein when the first stack frame is stored onto the stack, the bottom address associated with the first stack frame is stored in the first address register, and the top address associated with the first stack frame is stored in the second address register.

12. The method of claim 11, further comprising:
recursively:
storing onto the stack a second stack frame comprising the content of the second address register;
storing in the second address register the top address associated with a third stack frame stored onto the stack by the CPU, the third stack frame comprising an execution context of the CPU existing prior the servicing of a currently occurring ISR; and
setting at least one access rule to the hardware-protected region preventing the currently occurring ISR to be serviced from accessing the hardware-protected region of the stack, the hardware-protected region extending between the address of the stack stored in the first address register and the address of the stack stored in the second address register.

13. The method of claim 11, wherein, when the occurring ISR has been serviced, storing in the second address register one address selected between: a null address, the bottom address associated with the first stack frame, and the content of the latest stored second stack frame.

14. The method of claim 11, wherein, when the occurring ISR has been serviced, storing in the second address register one address selected between: a null address, the bottom address associated with the first stack frame, and the content of the latest stored second stack frame.

15. A computer system comprising:
a first memory storing an interrupt stack, the interrupt stack structured as a Last In-First Out (LIFO) buffer and having memory addresses extending between a top address and a bottom address;
a second memory storing a software program;
a first processing means configured to access the software program and including an interrupt protection unit with a first address register, a second register and a second processing means coupled to the first address register and the second address register, the first and the second address register each storing a respective address of the interrupt stack, and the first and second processing means coupled to the first memory to access the interrupt stack to store and remove at least one stack frame onto and off the stack as directed by the software program, the second processing means configured to:
set an access rule based on at least the first and second address registers when a first stack frame is stored onto the stack and an execution of the software program is suspended by the first processing means responsive to an occurrence of a first interrupt service request (ISR) to prevent a first interrupt service routine that services the first ISR from accessing a hardware-protected region of the stack, the hardware-protected region of the stack comprising the first stack frame and at least one stack frame associated with one or more suspended interrupt service routines that service one or more suspended ISRs,
wherein when the first stack frame has been stored onto the stack and the execution of the software program is suspended by the first processing means, responsive to one or more occurring ISRs the second processing means is configured to hold a first set of contiguous stack frames corresponding to the first ISR, a second set of contiguous stack frames corresponding to a second ISR and a third set of contiguous stack frames corresponding to a third ISR in the stack in a LIFO linked list, until the one or more occurring ISRs interrupt service requests are serviced.

16. The computer system of claim 15, wherein the LIFO linked list is part of the LIFO buffer.

17. The computer system of claim 15, wherein the first address register stores the bottom address and the second address register stores the top address.

18. The computer system of claim 15, wherein when the first stack frame is stored onto the stack, the second processing means stores the bottom address associated with the first stack frame in the first address register, and the second processing means stores the top address associated with the first stack frame in the second address register.

19. The computer system of claim 18, wherein the second processing means recursively:
   stores onto the stack a second stack frame comprising the content of the second address register;
   stores in the second address register the top address associated with a third stack frame stored onto the stack by the first processing means, the third stack frame comprising an execution context of the first processing means existing prior the servicing of a currently occurring ISR; and
   sets at least one access rule to the hardware-protected region preventing the currently occurring ISR to be serviced from accessing the hardware-protected region of the stack, the hardware-protected region extending between the address of the stack stored in the first address register and the address of the stack stored in the second address register.

20. The computer system of claim 19, wherein, when the occurring ISR has been serviced, the second processing means stores in the second address register one address selected between: a null address, the bottom address associated with the first stack frame, and the content of the latest stored second stack frame.

* * * * *